United States Patent [19]
Yasuhiro

[11] 3,826,126
[45] July 30, 1974

[54] APPARATUS FOR TESTING PRESSURE RESISTANCE OF CONTAINERS

[75] Inventor: Tomita Yasuhiro, Nishinomiya, Japan

[73] Assignee: Yamamura Glass Kabushiki Kaisha, Nishinomiya Hyogo, Japan

[22] Filed: Oct. 27, 1972

[21] Appl. No.: 301,508

[30] Foreign Application Priority Data
Dec. 22, 1971 Japan.............................. 46-104984

[52] U.S. Cl.......................... 73/37, 73/45.1, 209/73
[51] Int. Cl. .............................................. G01m 3/02
[58] Field of Search......... 73/37, 41, 45, 45.1, 45.2; 209/73, 75

[56] References Cited
UNITED STATES PATENTS

| 2,314,310 | 3/1943  | Jackson et al. ........................ 73/37   |
| 2,606,657 | 8/1952  | Berthelsen ..................... 73/45.1 X       |
| 2,689,475 | 9/1954  | Blanton................................. 73/37  |
| 3,010,310 | 11/1961 | Rowe.................................. 73/45    |
| 3,489,275 | 1/1970  | Powers, Jr. ....................... 73/37 X     |
| 3,650,146 | 3/1972  | Babunovic ............................. 73/37   |
| 3,704,623 | 12/1972 | Kulig.................................. 73/37   |

FOREIGN PATENTS OR APPLICATIONS
695,547  12/1930  France................................. 73/37
121,960  10/1958  U.S.S.R.................................. 73/37

Primary Examiner—Richard C. Queisser
Assistant Examiner—Joseph W. Roskos
Attorney, Agent, or Firm—Holman & Stern

[57] ABSTRACT

An apparatus comprising drive means for bringing a great number of pressure resistance testing heads successively at equal spacing to a testing station at a speed equal to the speed of travel of containers to be tested, feed means for sending the containers to the testing station at the same spacing as the testing heads, means for inserting nozzles of the testing heads into the containers respectively at the testing station, pressure fluid supply means for supplying a low pressure fluid through the testing heads into the containers and subsequently supplying high pressure fluid into the containers, means for causing the testing heads to seal the mouths of the containers and chuck the containers immediately before the supply of the high pressure fluid, means for permitting the testing heads to hold the containers in suspension during the supply of the high pressure fluid, and means for freeing the containers from the chucking and discharging the same at the terminal end of the testing station after testing.

4 Claims, 9 Drawing Figures

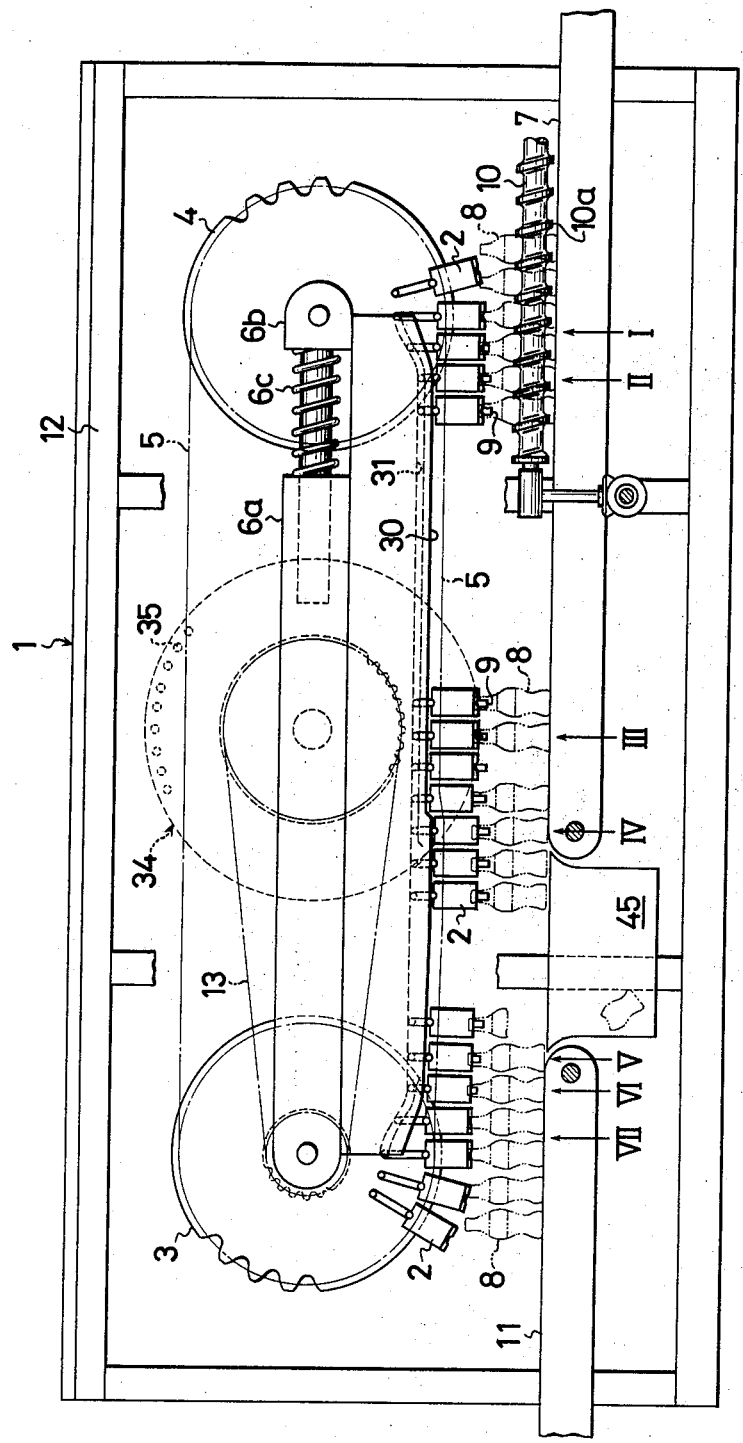

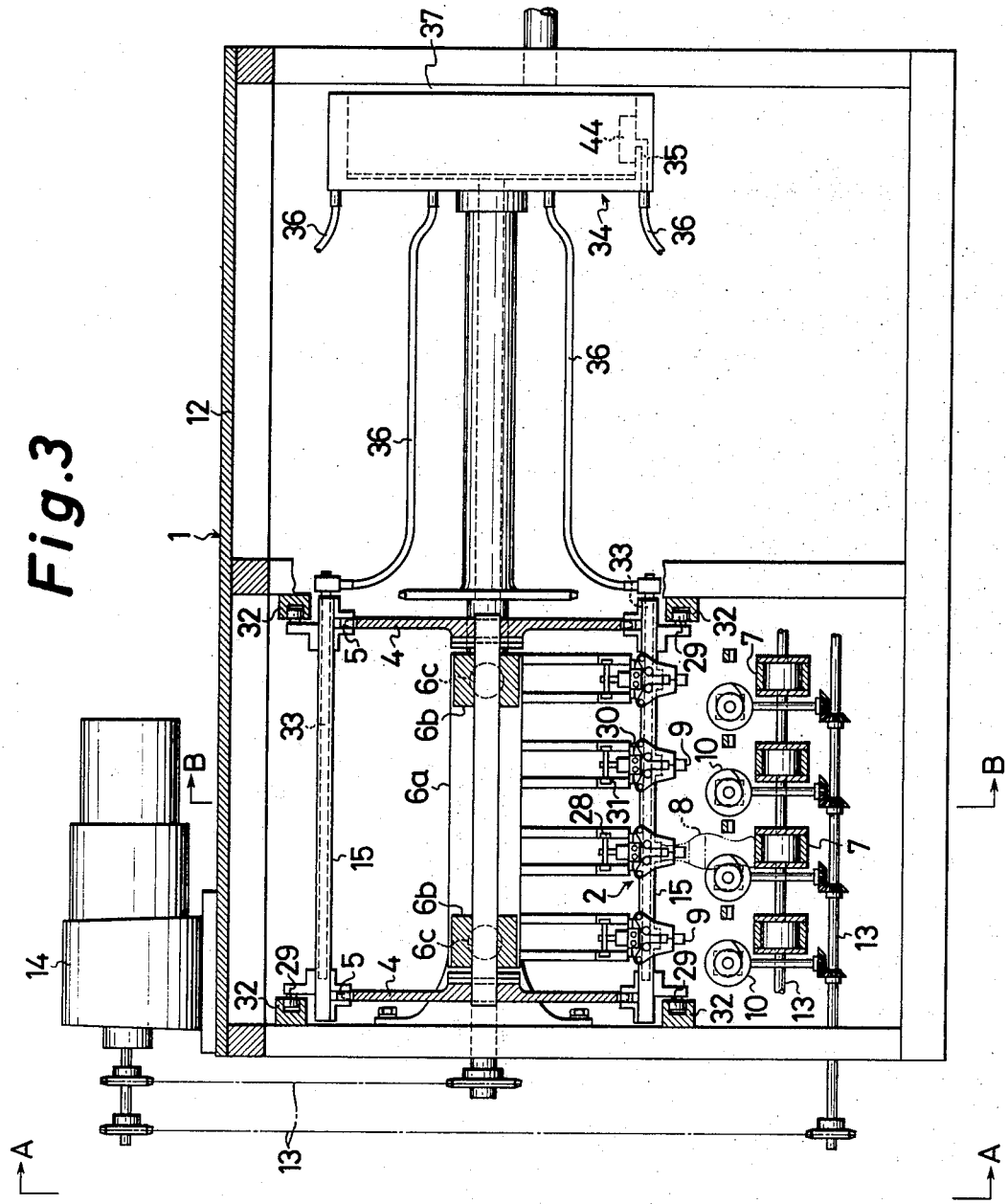

APPARATUS FOR TESTING PRESSURE RESISTANCE OF CONTAINERS

BACKGROUND OF THE INVENTION

The present invention relates to an apparatus for testing pressure resistance of pressure resistant glass bottles for containing carbonated drinks and other pressure resistant containers of various types.

All pressure resistant containers, especially those collected after use, have to be subjected to severe pressure resistance test, which is generally conducted by injecting pressure fluid (usually high pressure water) into the containers.

Such pressure resistance test has heretofore been conducted by pressing the heads of resistance testing means against the mouths of containers such as glass bottles placed on a testing table to seal the bottle mouths with the testing heads by the pressing force and introducing high pressure water into the containers through the testing heads.

According to this method, however, the containers on the testing table are subjected to the pressing force exerted thereon by the testing heads to seal the containers, so that during testing the bursting of a container due to the internal pressure of the high pressure water plus the aforementioned pressing force occurs under external conditions different from those under which a container filled with a carbonated drink or the like bursts while being left standing. Thus the conventional method fails to achieve proper testing.

SUMMARY OF THE INVENTION

An object of this invention is to provide an apparatus for testing the pressure resistance of pressure resistant containers such as bottles which is capable of applying a fluid pressure to the containers under exactly the same conditions as when a container will be burst only by an increased internal pressure acting thereon, so as to assure proper pressure resistance test.

Another object of this invention is to provide an apparatus for testing the pressure resistance of pressure resistant containers such as bottles in a full automatic operation.

Another object of this invention is to provide an apparatus by which the pressure resistance of all of a great number of pressure resistant containers can be tested efficiently.

Still another object of this invention is to provide an automatic pressure resistance testing apparatus which can be incorporated in the line of automatic washing and automatic filling operations for pressure resistant containers such as bottles.

According to this invention, a high pressure fluid (usually high pressure water) for testing pressure resistance is supplied to containers to be tested as they are chucked by pressure resistance testing heads in suspension. The testing heads chuck the mouths of the containers to be tested and seal the mouths watertightly or hermetically when the containers are in the suspended position.

The containers to be tested are therefore subjected only to the internal pressure of the high pressure fluid therein for the testing of pressure resistance. The conditions involved are equivalent to those under which containers filled with a carbonated drink or the like and left to stand in natural environment are subjected to an increased internal pressure.

The apparatus of this invention comprises drive means for bringing a great number of pressure resistance testing heads successively at equal spacing to a testing station at a speed equal to the speed of travel of containers to be tested, feed means for sending the containers to the testing station at the same spacing as the testing heads, means for inserting nozzles of the testing heads into the containers respectively at the testing station, pressure fluid supply means for supplying a low pressure fluid through the testing heads into the containers and subsequently supplying a high pressure fluid into the containers, means for causing the testing heads to seal the mouths of the containers and chuck the containers immediately before the supply of the high pressure fluid, means for permitting the testing heads to hold the containers in suspension during the supply of the high pressure fluid, and means for freeing the containers from the chucking and discharging the same at the terminal end of the testing station after testing.

The drive means for the pressure resistance testing heads comprises chain conveyors or the like fixedly carrying a great number of testing heads at equal spacing. The feed means for feeding the containers to be tested comprises the combination of a belt conveyor extending for example from an uncasing station to a position in the testing station where the supply of high pressure water is initiated and adapted to be driven at a speed equal to that of the chain conveyors while carrying the containers thereon and a screw conveyor for aligning the containers at the same spacing as the testing heads. Extending along the path of movement of the testing heads are guide rails for inserting the nozzles of the testing heads into the mouths of the containers sent to the testing station and withdrawing the nozzles therefrom at the terminal end of the testing station, guide rails for pressing the testing heads against the mouths of the containers in watertight sealing contact therewith at the position where supply of high pressure water is initiated, and guide rails in contact with chucking arm actuating members on the testing heads for causing chucking arms on the testing heads to chuck the mouths of the containers at the same position so as to maintain the sealing contact and for freeing the bottles from the chucking at the terminal end of the testing station.

The pressure fluid supply means comprises the aforementioned nozzles, a source for supplying the low pressure fluid, another source for supplying the high pressure fluid and a changeover valve for supplying the low pressure fluid and then high pressure fluid to the nozzles. The changeover valve is a rotary valve which is driven in operative relation to the chain conveyors to perform its changing-over operation automatically.

The containers chucked by the testing heads are held by the heads in suspension upon reaching the high pressure water supply initiating position where the belt conveyor serving as the feed means terminates.

At the position where the pressure resistance test is completed, there is disposed another belt conveyor serving as discharge means, which receives the containers from the testing heads after testing and sends out the same from the testing station. The discharge conveyor serves as means for feeding the containers to the subsequent washing process.

Other objects and features of this invention will become more apparent from the following description.

BRIEF DESCRIPTION OF THE DRAWINGS

FIG. 2 is a front view partly in section along the line B—B in FIG. 3;

FIG. 3 is a side elevation of the principal part as seen in the direction of arrows along the line C—C in FIG. 1;

DESCRIPTION OF THE PREFERRED EMBODIMENT

Figure 1:
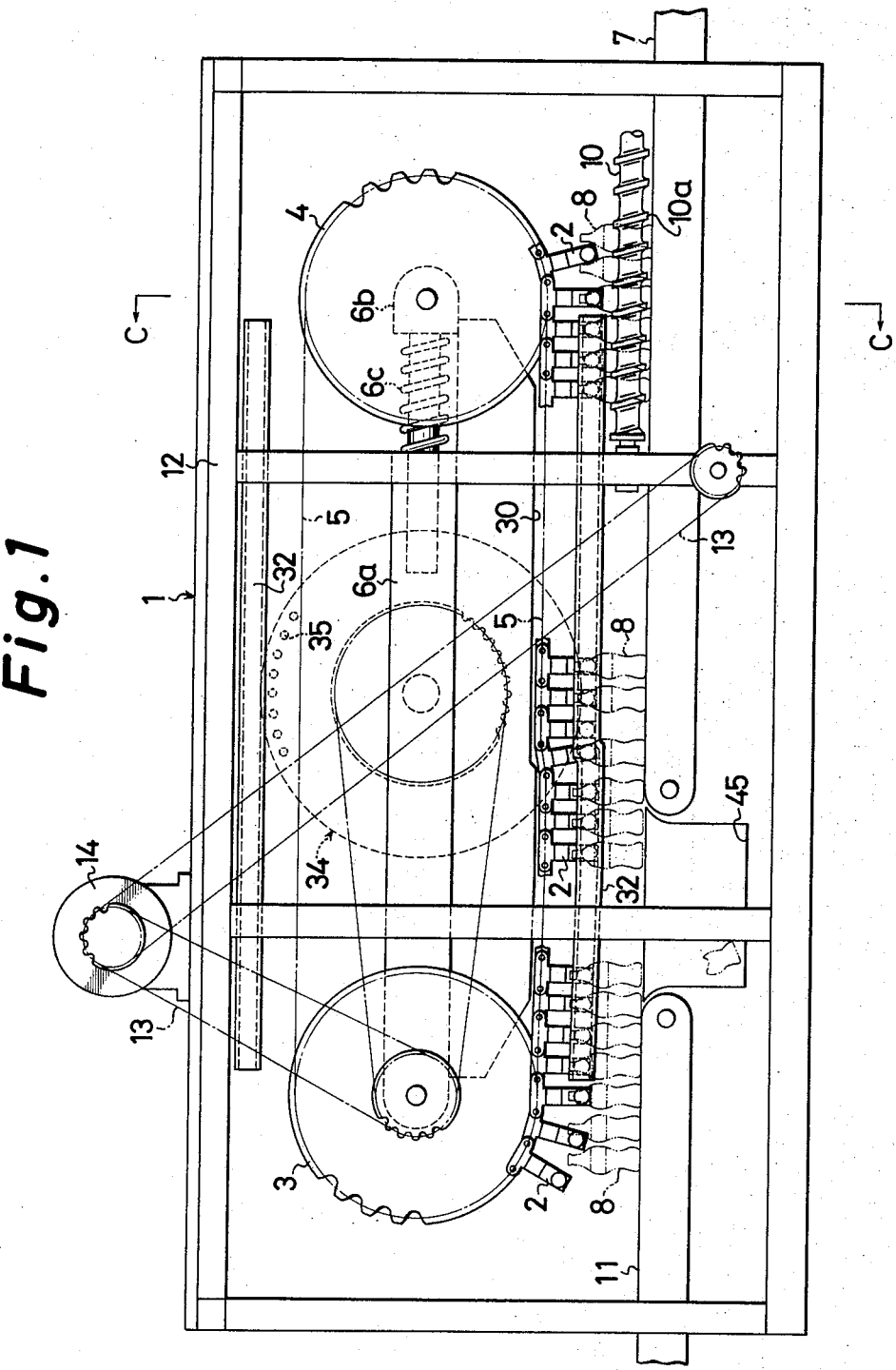
FIG. 1 is a front view showing the principal part of an embodiment of this invention as seen along the line A—A in FIG. 3.

Referring to the drawings, a pressure resistance testing apparatus 1 has a great number of heads 2 for testing pressure resistance which are mounted at equal spacing on endless conveyor belts 5 such as chains reeved around drive wheels 3 and 4. When driven, the conveyor belts 5 send the testing heads 2 to a pressure resistance testing station one after another. Disposed between the drive wheels 3 and 4 is tension means comprising a support 6a, a bearing 6b and a screw 6c screwed in the support 6a for adjusting the distance between the support 6a and the bearing 6b to keep the endless conveyor belts 5 taut.

Below the endless conveyor belts 5 there is provided a belt conveyor 7 to be driven horizontally at the same speed as the conveyor belts 5. Glass bottles 8, containers to be tested, are fed to the testing station on the conveyor 7. The terminal end of transport path of the conveyor 7 is located near the position where supply of high pressure water is initiated.

Disposed above the belt conveyor 7 is a screw conveyor 10 for aligning the bottles 8 on the conveyor 7 in such position that nozzles 9 on the heads 2 can be inserted into the mouths of the bottles respectively, the bottles 8 thus being arranged at the same spacing as the heads 2. The bottles 8 placed irregularly on the belt conveyor 7 are aligned in position by the helical projection 10a of the rotating screw conveyor 10.

Below the endless conveyor belts 5 there is another belt conveyor 11 positioned horizontally substantially at the same level as the path of transport of the belt conveyor 7 and to be driven in the same direction as the conveyor 7. The starting end of transport path of the belt conveyor 11 is spaced by a suitable distance from the terminal end of transport path of belt conveyor 7 so that the bottles 8 may be transported while being chucked by the testing heads 2 in suspension.

The conveyor means described above are supported on a frame 12 of the apparatus and driven by a motor 14 through chain transmission means 13, etc.

Figure 7:
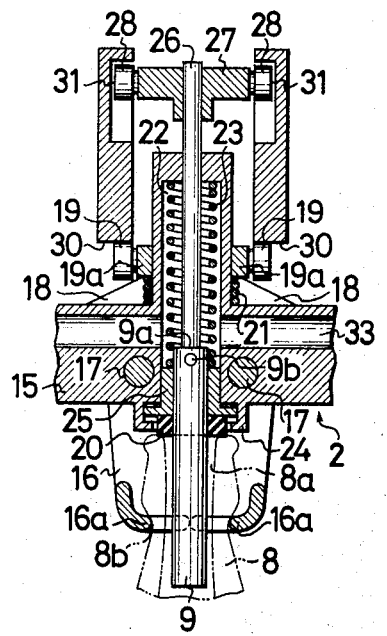
FIG. 7 is a side elevation in vertical section showing the same in its chucking position.
Figure 5:
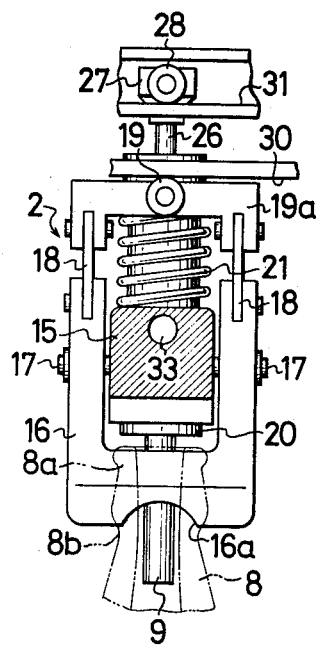
FIG. 5 is a front view showing the principal part of the testing head.
Figure 6:
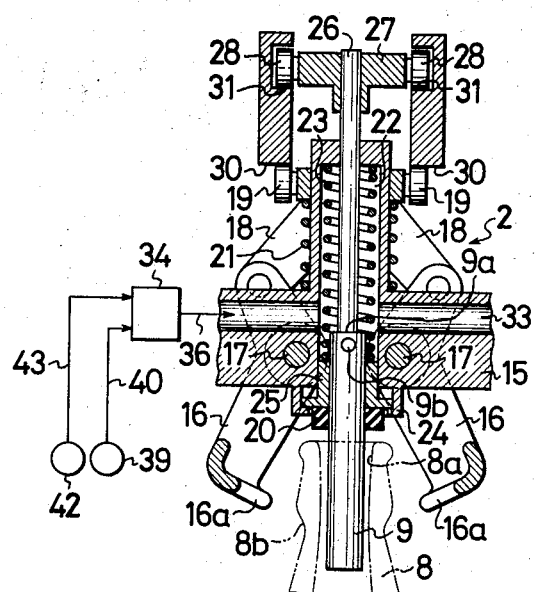
FIG. 6 is a side elevation in vertical section showing the same.

The testing heads 2 are shown in FIGS. 3, 5, 6 and 7. The drawings show four testing lines, for which four sets of chucking arms 16 are pivoted respectively as at 17 to a barlike main body 15 supported at its opposite ends on two parallel chains 5. The arms 16 in each pair are articulated by links 18 to a support member 19a for driven rollers 49. Each nozzle 9 is supported by the main body 15 in upwardly and downwardly movable manner. The arms 16 are such that when the rollers 19 are depressed, with the nozzle 19 inserted in the mouth 8a of the bottle 8 and with a packing 20 on the under face of the main body for sealing the mouth pressed against the brim of the bottle mouth, pawls 16a grip the neck 8b of the mouth 8a as seen in FIG. 7. The roller support member 19a, urged upward by a spring 21, opens the pawls 16a as shown in FIG. 5 when the rollers 19 are pushed upward.

The main body 15 is integrally formed with cylinders 22 each with a closed upper end and positioned in corresponding relation to the testing lines respectively. A piston 25 urged downward by a spring 23 and embraced by a stopper 24 so as to be movable upward and downward within a specified range fits in the cylinder 22 and has the packing 20 fixed to its under face.

The nozzle 9 is in the form of a plunger extending through the packing 20 and through the piston 25 in upwardly and downwardly movable manner and has a pressure receiving face 9a positioned in the cylinder 22. In a side portion to be positioned within the cylinder 22, the nozzle is formed with an inlet 9b for permitting a pressure fluid supplied in the cylinder 22 to be injected into the bottle 8. The nozzle 9 further has a rod 26 extending upward therefrom th the cylinder 22 and having at its upper end a fixed member 27 with driven rollers 28 rotatably supported on the member 27.

The main body 15 rotatably carries driven rollers 29 at its opposite ends. As seen in FIGS. 1 to 4, the driven rollers 19 are guided by guide rails 30, the rollers 28 by guide rails 31 and rollers 29 by guide rails 32. As illustrated in FIG. 1, the guide rails 32 are also provided at an upper portion of the apparatus to protect the travelling endless chain belts 5 from an excess load.

The guide rails are so arranged in the path of the respective driven rollers that the guide rails 31 control the insertion of the nozzle 9 into the bottle mouth, the guide rails 32 being adapted to control pressing of the packing against bottle mouth, namely the sealing of the bottle mouth 8a with the main body 15 of the testing head 2, the guide rails 30 being adapted to control the chucking arms 16 in chucking the bottle mouth.

The main body 15 is further formed with a fluid passage 33 for introducing the pressure fluid into the cylinders 22. The passage 33 is connected to a pressure fluid changeover valve 34 by way of a port 35 and a flexible tube 36. The ports and flexible tubes are respectively identical to the testing heads 2 in number.

Figure 8:
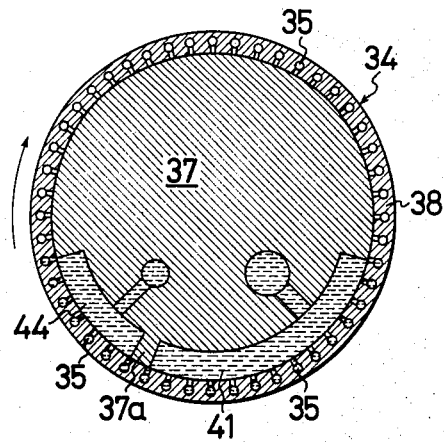
FIG. 8 is a sectional view showing a changeover valve for supplying low pressure fluid and high pressure fluid.

As illustrated in FIG. 8, the pressure fluid changeover valve 34 comprises a stationary valve member 37 and a rotary valve member 38 fitted around the valve member 37, the stationary valve member 37 having a low pressure water chamber 41 to be supplied with low pressure water from a supply source 39 (see FIG. 6) through a duct 40 and a high pressure water chamber 44 to be supplied with high pressure water from a supply source 42 through a duct 43. The chambers 41 and 44 are open along the periphery of the stationary valve member 37 over suitable circumferential lengths respectively. The openings are closed by the rotary valve member 38. The ports 35 are open to the inner face of the rotary valve member 38. Through the rotation of the rotary valve member 38, the ports 35 communicate with the chambers 41 and 44 one after another to supply low pressure water and high pressure water to the testing heads 2 in succession.

The rotary valve member 38 is driven at such rate that it makes one turn of rotation while the endless conveyor belts 5 carrying the testing heads 2 thereon make one revolution. The circumferential lengths of the chambers 41 and 44 correspond to the amount of travel of the bottles 8 and are so determined that during the rotation of the rotary valve member 38, low pressure water and high pressure water can be supplied to the bottles 8 through the nozzles 9 in a required amount for a desired period of time.

Figure 4:
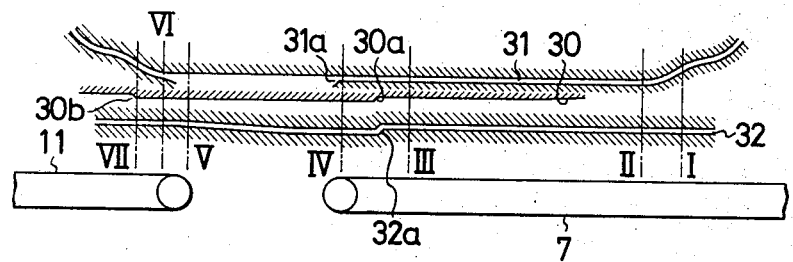
FIG. 4 is a front view showing the relative positions of the cams for operating the testing heads.

Thus according to the invention, testing heads 2 mounted on the endless conveyor belts 5 and guided by the guide rails 32 are successively sent onto the bottles 8 which are aligned in position and fed by the screw conveyor 7 in such manner that at a point I in FIGS. 2 and 4 the chucking arms 16 on the heads 2 fit over the mouths 8a of the bottles and the nozzles 9 start to move down into the mouths 8a by being guided by the guide rails 31. The downward movement of the nozzles 9 terminates at a point II.

As already described, the rotary valve member 38 of the pressure fluid changeover valve 34 rotates in timed relation to the endless conveyor belts 15. When the cylinder 22 of the testing head 2 reaches the point II, the port 35 communicating with the cylinder 22 through the duct 36 and the fluid passage 33 comes to the position of the low pressure water chamber 41, permitting the chamber 41 to communicate with the nozzle 9 to supply the low pressure water to the bottle 8. Because of the necessity to expel air from the bottle 8 during the supply of the water, the guide rails 32 guide the main body 15 so as to maintain an appropriate clearance between the top of the bottle mouth and the packing 20 on the main body 15.

The length of the low pressure water chamber 41 along the circumference of the stationary valve member 37 is such that when reaching a point III the bottle 8 will be filled with the low pressure water after commencement of supply of the water at the point II. Accordingly, during the travel of the bottle from point II to point III, the bottle is filled with the low pressure water and, when the bottle reaches the point III, the port 35 communicating with the bottle 8 reaches the closed portion 37a of the stationary valve member 37.

The guide rails 32 are bent as at 32a so as to move the main body 15 downward immediately after the testing head 2, supplying the low pressure water to the bottle 8, has passed the point III, whereby, whereby the packing 20 on the main body 15 is urged into pressing contact with the bottle mouth. Although the piston 25 moves up slightly within the cylinder 22, the spring 23 acts to keep packing 20 in watertight sealing contact with the brim of mouth of the bottle 8.

The guide rails 30 are bent as at 30a so that immediately after the mouth brim of the bottle 8 has been sealed as described above, the guide rails 30 will depress the driven rollers 19 to cause chucking arms 16 to grip the neck 8b of the bottle mouth 8a. Thus the bottle 8 is held by the testing head 2.

When the bottle 8 chucked by the testing head 2 reaches point IV, the port 35 communicating with the bottle 8 communicates with the high pressure water chamber 44 in the stationary valve member 37 to start supply of high pressure water to the bottle 8.

At this time, the bottle reaches the terminal end of transport path of the belt conveyor 7 and is held by the testing head 2 in suspension. At the same position, the under edges 31a of the guide rails 31 are left open.

Accordingly, the nozzle 9 is kept inserted in the bottle mouth to continuously supply the high pressure water due to the frictional force between the nozzle 9 and the sealing piston 25 and packing and water pressure acting on the under face of the nozzle 9 which are in balance with water pressure acting on the pressure receiving upper face 9a of the nozzle 9. If at this time the bottle bursts, the water pressure within the bottle will be reduced to zero, whereupon the water pressure on the pressure receiving face 9a urges the nozzle 9 downward to position the inlet 9b within the inner bore of the seal piston 25. The water passageway of the nozzle 9 is therefore blocked to prevent discharge of high pressure water. In this way, the opened under edges of the guide rails 31 serve to prevent discharge of the high pressure water in the event of the bottle bursting.

Below the path of transport of the suspended bottles 8, there is provided a receptacle 45 for receiving pieces of ruptured bottle.

When the suspended bottle 8 reaches a point V, the port 35 communicating with the bottle moves past the high pressure water chamber 44, whereupon the supply of water is terminated. In other words the length of the chamber 44 along the circumference of the stationary valve member 37 corresponds to the distance (time) of travel of the bottle 8 from point IV to point V.

Upon the bottle 8 reaching a position VI, the guide rails 31 start to withdraw the nozzle 9, which is completely withrawn at a position VII, whereupon the bent portions 30b in the guide rails 30 cause the driven rollers 19 to return upward, opening the chucking arms 16 to place the bottle 8 on the discharge belt conveyor 11, by which bottles are sent out from the testing station after testing.

The testing heads are circulated along the guide rails 32 by the endless conveyor belts 5.

Figure 9:
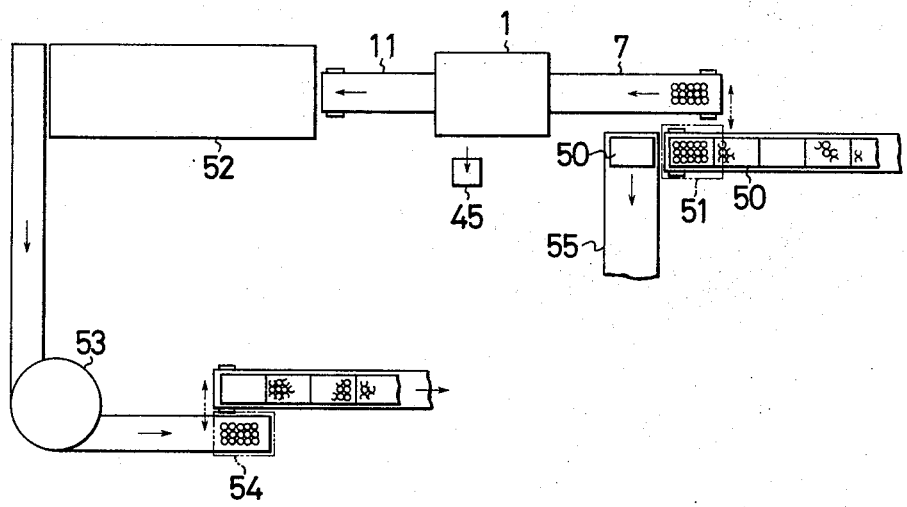
FIG. 9 is a diagram showing an exemplary layout of automatic testing, washing and filling lines for pressure resistant containers such as glass bottles.

The pressure resistance testing apparatus 1 described serves to avoid bursting accidents due to deteriorated pressure resistance of containers for carbonated drinks and the like which are collected after use. As seen in FIG. 9, the apparatus can be installed at an intermediate portion of a line for taking out collected bottles from cases 50 by an uncaser 51 and supplying them to an automatic washing machine 52.

Thus an automatic line can be provided which comprises the uncaser 51, pressure resistance testing apparatus 1, automatic washing apparatus 52, filler 53 for automatically filling containers with beverages and an encaser 54. Indicated at 55 is a conveyor for sending empty cases 50 to an encasing station.

What is claimed is:

1. An apparatus for testing pressure resistance of containers comprising an endless rotary mechanism for bringing a great number of pressure resistance testing heads successively at equal spacing in a horizontally linear direction to a testing station at a speed equal to the speed of travel of containers to be tested and turning the testing heads over after testing, and returning them to their original position, each of the testing heads having a nozzle to be guided by guide rails into the container to be tested for supplying a low pressure fluid from a low pressure fluid chamber and a high pressure fluid from a high pressure fluid chamber successively into the container by means of a changeover valve comprising a stationary valve member and a rotary valve member, means for keeping the main body of the head in sealing contact with the mouth brim of the container by being guided by other guide rails during supply of the high pressure fluid and chucking means to be guided by other guide rails to hold the container to the testing head main body by chucking the same in suspension during supply of the high pressure fluid; feed means for sending the containers to the testing station at the same spacing as the testing heads, said feed means having means for aligning the containers in position in corresponding relation to the testing heads; and means for receiving the containers freed from chucking by the testing heads at the terminal end of the testing station and discharging the containers from the testing station.

2. The apparatus as set forth in claim 1, wherein said feed means comprises a belt conveyor equipped at its upper side and a screw conveyor for aligning the containers to be tested in position in corresponding relation to the testing heads.

3. The apparatus as set forth in claim 1, wherein the low and high fluid chambers of said changeover valve are arranged circumferentially of said stationary valve member and wherein said rotary valve member has ports communicating with the testing heads respectively and identical to the testing heads in number, said rotary valve member being rotatable in synchronism with the testing heads to cause each of the ports to communicate with the low pressure fluid chamber and then with the high pressure fluid chamber.

4. The apparatus as set forth in claim 1 wherein each of the testing heads has a sealing piston disposed within a cylinder formed in its main body, the nozzle extending through the sealing piston and having a pressure fluid inlet opened to the interior of the cylinder and a pressure receiving face positioned within the cylinder, and the guide rails for guiding the nozzle into and out of the container have open spaces along the under edges thereof where the container travels while being supplied with the high pressure fluid so as to permit the internal pressure of the cylinder to act on the pressure receiving face and urge the nozzle downward upon bursting of the container, whereby the pressure fluid inlet of the nozzle is closed with the sealing piston.

* * * * *